(12) United States Patent
Coronel

(10) Patent No.: US 8,113,948 B1
(45) Date of Patent: Feb. 14, 2012

(54) METHOD AND SYSTEM FOR A GAMING OR GAMBLING OPERATOR FOR ISSUING SECONDARY VALUE FOR REDEMPTION OF PRIMARY VALUE

(76) Inventor: Jack Bertram Coronel, Las Vegas, NV (US)

( * ) Notice: Subject to any disclaimer, the term of this patent is extended or adjusted under 35 U.S.C. 154(b) by 277 days.

(21) Appl. No.: 11/509,120

(22) Filed: Aug. 23, 2006

Related U.S. Application Data

(60) Provisional application No. 60/710,382, filed on Aug. 23, 2005.

(51) Int. Cl.
  *A63F 9/24* (2006.01)
  *A63F 13/00* (2006.01)
  *G06F 17/00* (2006.01)
  *G06F 19/00* (2011.01)
  *G06Q 30/00* (2006.01)

(52) U.S. Cl. .................. 463/25; 463/42; 705/14.12

(58) Field of Classification Search .............. 463/25, 463/42; 705/14.12
See application file for complete search history.

(56) References Cited

U.S. PATENT DOCUMENTS

| | | | | |
|---|---|---|---|---|
| 5,467,856 A * | 11/1995 | Okada | ............................. | 194/202 |
| 5,774,870 A * | 6/1998 | Storey | ........................ | 705/14.27 |
| 6,149,055 A * | 11/2000 | Gatto | .............................. | 235/379 |
| 6,371,852 B1 * | 4/2002 | Acres | ................................ | 463/25 |
| 6,892,182 B1 * | 5/2005 | Rowe et al. | ........................ | 705/14 |
| 7,063,617 B2 * | 6/2006 | Brosnan et al. | .................... | 463/25 |
| 7,291,068 B2 * | 11/2007 | Bryant et al. | ..................... | 463/25 |
| 7,318,774 B2 * | 1/2008 | Bryant et al. | ................... | 463/25 |
| 2002/0002075 A1 * | 1/2002 | Rowe | .............................. | 463/25 |
| 2002/0177479 A1 * | 11/2002 | Walker et al. | .................... | 463/25 |
| 2003/0036427 A1 * | 2/2003 | Brandstetter et al. | ........... | 463/29 |
| 2003/0054868 A1 * | 3/2003 | Paulsen et al. | ..................... | 463/1 |
| 2004/0063494 A1 * | 4/2004 | Oram et al. | ...................... | 463/42 |
| 2005/0043088 A1 * | 2/2005 | Nguyen et al. | ................... | 463/29 |
| 2005/0143166 A1 * | 6/2005 | Walker et al. | .................... | 463/25 |
| 2005/0187012 A1 * | 8/2005 | Walker et al. | .................... | 463/25 |
| 2006/0068897 A1 * | 3/2006 | Sanford et al. | ................... | 463/25 |
| 2006/0121980 A1 * | 6/2006 | Heilala et al. | .................... | 463/25 |
| 2006/0277100 A1 * | 12/2006 | Parham | ............................ | 705/14 |

* cited by examiner

*Primary Examiner* — Peter DungBa Vo
*Assistant Examiner* — Wei Li
(74) *Attorney, Agent, or Firm* — Robert Ryan Morishita; Morishita Law Firm, LLC

(57) ABSTRACT

A method includes associating a user with a primary value identifier that, in turn, is associated with a primary value. Optionally, the primary value identifier is inactive until activated. Optionally, the user is also associated with a secondary value identifier. Upon redeeming at least a portion of the primary value for goods or services, a secondary value is presented to the user, optionally by association with the secondary value identifier. A system includes a database of primary value identifiers communicating directly or indirectly with an activation terminal and a redemption terminal and a gaming device receiving at least a portion of a secondary value for wagers in a game of chance.

14 Claims, 1 Drawing Sheet

METHOD AND SYSTEM FOR A GAMING OR GAMBLING OPERATOR FOR ISSUING SECONDARY VALUE FOR REDEMPTION OF PRIMARY VALUE

RELATED APPLICATION DATA

The present application claims the priority of U.S. Provisional Patent Application Ser. No. 60/710,382, entitled "Method and System for Issuing Secondary Value for Redemption of a Primary Value," filed Aug. 23, 2005 by Applicant herein.

FIELD OF THE INVENTION

The present invention relates to the rewards programs. Specifically, the present invention is a method and system for a gaming operator for issuing a secondary value, such as rewards points or gaming credits, for redemption of a primary value, such as a prepaid value-stored card or prepaid value-stored account.

BACKGROUND OF THE INVENTION

It is well known that casino gaming has developed from a regional activity to a national industry. Revenues have grown dramatically and are generally comprised of two categories: gaming and non-gaming. Today, non-gaming revenues, once an industry after thought have matured and share equal or superior status with gaming revenues in several major companies.

Non-gaming goods and services are diverse and include such items as: hotel inventory, spa services, food and beverage, live entertainment and retail. In a constantly changing industry, these non-gaming goods and services are growing and are integral to a company's continued success. Thus, unlike the past where gaming operators were willing to sell non-gaming goods and services at a loss to promote the company's gaming services, gaming companies now showcase non-gaming goods and services as a profit center just as it promotes its gaming services.

Promotion of these non-gaming services has taken many forms. For example, gift certificates, a long time standard of the retail industry, are a pre-paid piece of paper entitling the named party or bearer to the printed value. Yet another reward program uses co-branded credit cards. In this program, a financial institution issues a credit card which bears a merchant brand. Users are rewarded for retail purchases by tying the use of the reward to merchant loyalty. For example, consumers earn miles for every purchase placed on a credit card co-branded with an airline. The miles are then redeemable for that airline's tickets.

Customer clubs (also known as customer loyalty programs, customer rewards programs, frequent customer programs, or the like) are used by companies to track customer activity and reward customer loyalty with points that can be redeemed for goods or services, discounts, cash-back, or the like. In one form specific to the casino industry, player loyalty programs use player tracking cards that players use when gambling at gaming tables and gaming devices, or making purchases within a casino. These player tracking cards are used to measure a player's "action," i.e. the amount of gaming activity, and reward the player commensurate with the action measured. It is now well known that player tracking systems can track and reward players across multiple different locations through a linked system.

The disadvantage of any of these methods and systems, however, is that upon redemption, the user has no further inducement to purchase the provider's goods or services because, in effect, the user has used the value available. That is, if a user redeems a gift certificate or frequent flyer miles, the value is exhausted and the user starts again from scratch. After redemption, the user has no greater inducement to purchase further goods and services from the same provider than any other purchaser.

Thus, it can be seen that there is a need in the art for a method and system that builds upon itself by issuing a secondary value when a primary value is redeemed.

SUMMARY OF THE INVENTION

A user is associated with a primary value identifier which is, in turn, associated with a predetermined primary value. In an optional embodiment, the primary value is a monetary value, but it is contemplated that the primary value may represent points, credits, or any other representation of value. Optionally, the primary value is redeemable for non-gaming goods or non-gaming services. In an optional embodiment, the primary value identifier is in the form of a card, such as a prepaid value-stored card, but could also take many other forms, including an account, a code, a transmitter, a data storage device, or the like. The primary value identifier may directly store the primary value, such as in a value-stored card, or may represent the primary value, such as in a value-stored account. The primary value identifier may be encoded or otherwise identified by a unique identity.

A secondary value is defined. Optionally, the secondary value could represent points, discounts, credits, monetary value, or any other representation of value. In an optional embodiment, the secondary value is associated with a secondary value identifier. In such an optional embodiment, the secondary value identifier could be an account associated with the primary value identifier, or could be a separate and independent account identified by a separate and independent card, transmitter, storage device, or the like. For example, in an embodiment directed to use in a casino, the secondary value may represent reward points issued for a player loyalty program and the secondary value identifier may be a player tracking card that identifies a player loyalty account. However, it is contemplated that other embodiments may also be implemented in which the secondary value and secondary value identifier take different forms.

Optionally, the primary value identifier is ready for use when provided. In another optional embodiment, the primary value identifier is activated before redemption. In an optional embodiment requiring activation, activation may take place at an activation terminal that transmits an activation signal. Upon receipt of an activation signal, directly or indirectly from the activation terminal, a database identifies the primary value identifier as activated. Optionally, a signal confirming activation is transmitted back to the activation terminal. In an optional embodiment, the activation signal may include the identity of the primary value identifier. In an optional embodiment, additional information may also be transmitted to the database.

Optionally, the primary value may be redeemed in whole or part. In one such optional embodiment, the primary value may be decremented when at least a portion of the primary value is redeemed for goods or services (optionally non-gaming goods or non-gaming services). Optionally, redemption of the primary value occurs by presenting the primary value identifier.

Upon redemption of the primary value, at least a portion of the secondary value is provided to the user. In an optional embodiment in which a secondary value is associated with a secondary value identifier, a secondary value may be added to the balance identified by a secondary value identifier. In a further version of such an optional embodiment, if the user has not already activated the secondary value identifier at the time of redemption, it is contemplated that the secondary value identifier may be activated at that time. In an optional embodiment, the secondary value is exchanged for gaming services.

A system according to the present invention may include a database server storing primary value identifiers. The database server may additionally store primary values associated with each primary value identifiers. A system may also include an activation terminal adapted to transmit an activation signal that is communicated directly or indirectly to the database server. The activation terminal may include an input device to input information about the primary value identifier, such as the identity of the primary value identifier and, in an optional embodiment, the primary value. In such an optional embodiment, the database server may record activation of primary value identifiers by identifying primary value identifiers for which an activation signal has been received as activated. Optionally the database may store the primary value correlated to the primary value identifier. Additionally or alternatively, the primary value identifier may store the primary value.

The system may also include a redemption terminal that generates a redemption signal when a primary value is redeemed. Optionally, the redemption signal is directly or indirectly communicated to the database server. The redemption terminal may include an input device to input information about the primary value identifier. In one optional embodiment, a database at the database server is updated to reflect the redemption of at least a portion of the primary value. Optionally, the primary value is decremented by the portion of the primary value redeemed by decrementing the primary value stored at the database. Additionally or alternatively, the decremented primary value may be stored on the primary value identifier.

The database server may store, or may communicate with, a secondary database that stores a secondary value for a secondary value identifier for the user. As discussed above, the secondary value identifier and the primary value identifier may be the same. Upon redemption of at least a portion of the primary value, the secondary value associated with the secondary value identifier for the user is provided to the user.

In an optional embodiment, the system may also include one or more gaming devices, such as gaming machines and/or gaming tables, conducting a game of chance on which a wager may be placed. In such an optional embodiment, the secondary value may be received as all or a portion of the wager for the game of chance.

DESCRIPTION

Figure 1:
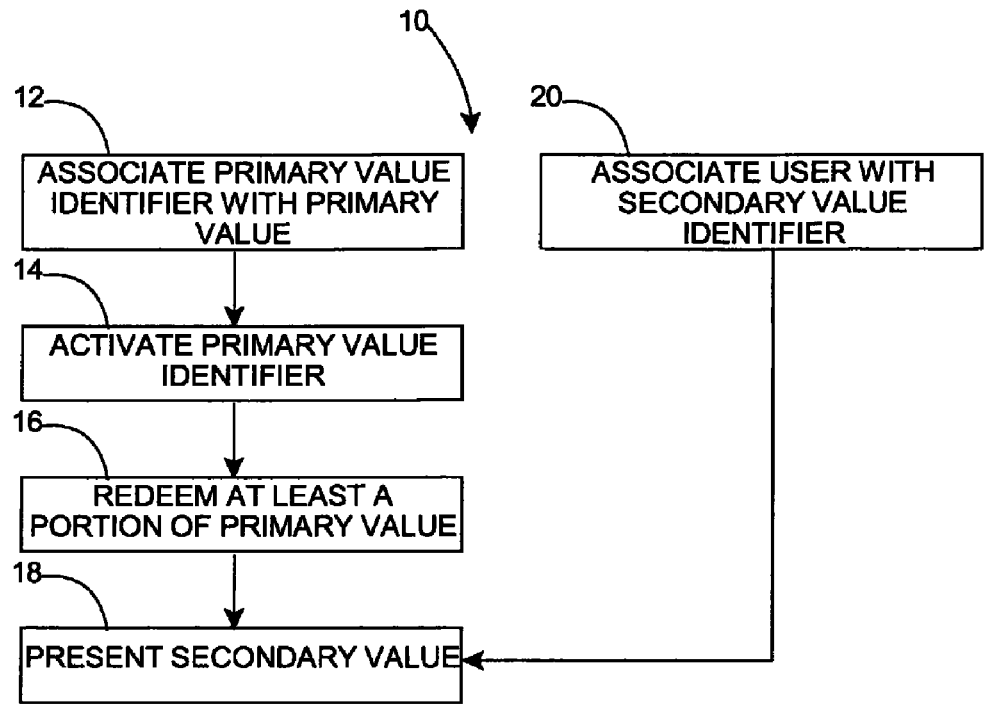
FIG. 1 is a flowchart of a method according to an embodiment of the present invention.

Reference is now made to the figures wherein like parts are referred to by like numerals throughout. The present invention includes a method 10 and system for issuing a secondary value upon redemption of a primary value. In its broadest embodiment, the primary value is associated 12 with a primary value identifier. The primary value identifier could take many forms, including a magnetic stripe card, a smart card, a storage device, a transmitter, such as a Bluetooth® or other radio frequency identification ("RFID") transmitter, or the like. Similarly, the primary value identifier could be a code, account number, user name and password combination, biometric measurement, or any other means for identifying the primary value associated therewith. Examples of primary value identifiers and the correlation of the primary value identifier with a primary value are given below.

The primary value itself could also take many forms. In one optional embodiment, the primary value is a monetary value, although the primary value could represent credits, points, or any other representation of value. Optionally, the primary value is initially a fixed discrete amounts although it is also contemplated that a user may, in an optional embodiment, select the initial primary value. In one optional embodiment, the initial primary value is determined when the primary value identifier is obtained by the user. It is contemplated that an optional embodiment may allow the user to review the primary value for a primary value identifier. For example, the user may be provided with a kiosk or website address that permits access to the primary value balance. It is also contemplated that in an optional embodiment, a user may be allowed to supplement the primary value. For example, a user may be allowed to increase the primary value using a kiosk or website address at which the user provides payment information for the additional value added to the primary value.

For example, in one optional embodiment, the primary value identifier is a plastic card encoded and/or embossed with an identity, such as a number or code uniquely identifying the primary value identifier. The plastic card is associated with a "prepaid" quantity that represents the primary value. For example, a user may purchase the plastic card with a prepaid value of $50.00. In such an example, the $50.00 represents the initial primary value associated with the primary value identifier represented by the plastic card.

Optionally, the primary value identifier may be inactive until activated 14. In such an optional embodiment, the primary value identifier may be activated at the time that the user purchases the primary value identifier. In one optional embodiment, the primary value identifier is activated by transmitting an activation signal directly or indirectly to a database, optionally including the primary value identifier's identity as well as the initial primary value. Optionally, the primary value identifier is activated at an activation terminal 22 communicating directly or indirectly with a database server 24 storing a database of primary value identifiers. In such an optional embodiment, the activation terminal 22 could take many different forms and may include an input device, including a conventional bar code or magnetic stripe reader typically used at a point-of-sale or cash register, that identifies the primary value identifier and transmits an activation code to a database. In such an optional embodiment, the transmission could likewise take many different forms, including sending a signal over a computer network, such as a local area network, a wide area network, or the Internet, sending a signal over a telephone line, sending a signal wirelessly, or any other form of transmission. It is also noted that the transmission could occur in real time, or an activation terminal 22 could periodically transmit any activation signals received over a period of time. It is also noted that the activation signal may be communicated directly from an activation terminal to a database server 24, as shown in the optional embodiment of FIG. 2, or may be relayed by or through one or more transaction processors 28, as shown in the optional embodiment of FIG. 3.

Figure 2:
FIG. 2 is a block diagram of a system according to an embodiment of the present invention.
Figure 3:
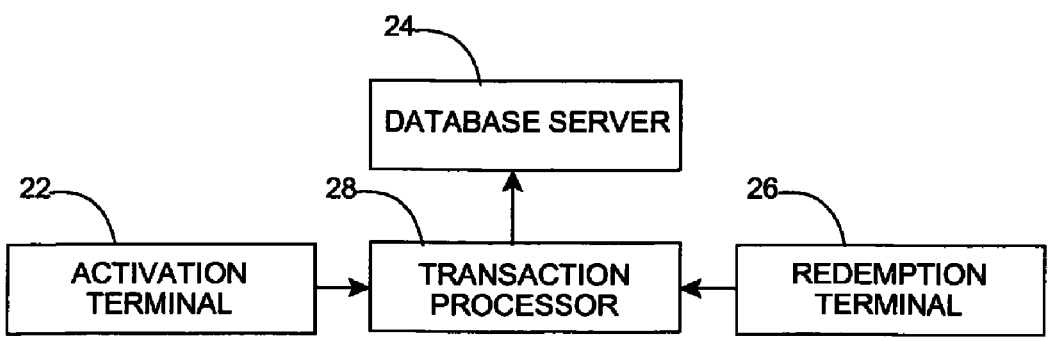
FIG. 3 is a block diagram of a system according to an embodiment of the present invention.

Referring generally to FIGS. 1-3, for example, in one optional embodiment, a user could select a primary value identifier in the form of a plastic card from a merchant's rack and take it to a cashier for purchase and activation. In an optional embodiment, the plastic card is associated with an initial primary value, optionally based on the purchase price, and activated using, for example, a magnetic stripe card reader or a bar code system that is part of the merchant's point of sale, as an activation terminal 22. In this optional embodiment, the plastic card on the merchant's rack in inactive until it is scanned and an activation signal is transmitted to the database. Optionally, information such as the identity of the merchant, the merchant's employee activating the card, the location of retailer, the prepaid amount of card, i.e. the initial primary value, date sold, and the like may also be collected and transmitted as an activation signal. As noted, the merchant may transmit activation signals in real time or on a batch basis. It is noted that for accounting purposes, the provider of goods or services where the primary value may be redeemed could immediately recognize the revenue and related service liability for accounting purposes.

In another example, an optional embodiment may permit an online purchase of a primary value. In such an optional embodiment, a user could communicate via a computer network, such as the Internet or an intranet, to select and purchase a primary value in the form of a prepaid account. While the primary value identifier could take many different forms, in an optional embodiment, the primary value identifier is a code associated with the primary value purchased. A database is notified that the primary value for the primary value identifier is active substantially as described previously. Optionally, additional data may be provided to the user along with the code, such as the primary value amount, the date purchased, and the like. Optionally, the code is in the form of a bar-code, glyph, text, or other readable code.

In yet another example of an optional embodiment, a primary value identifier may be provided to users as a promotion. In such an optional embodiment, a primary value identifier may be delivered to the user, such as by mail, e-mail, or the like, with a primary value already associated. The primary value identifier in such an optional embodiment may be used to entice the user to redeem the primary value through the primary value itself as well as the secondary value realized when the primary value is redeemed as described below. For example, a user may receive a primary value identifier in the form of a card or voucher in the mail that is already associated with a primary value. The primary value identifier may include a serial number or code to identify the primary value identifier. Additionally, the primary value may be previously activated so that the primary value may be redeemed without any intermediate steps, or the primary value may require activation, thereby permitting the provider of goods and/or services to promote its goods and/or services, gather information, and/or establish an account for tracking and rewards purposes such as a secondary value identifier discussed in an optional embodiment below.

A secondary value is defined. As explained in greater detail below, the secondary value is the value presented to the user upon redemption of the primary value. The secondary value may represent one or more of a monetary value, points, discounts, credits, eligibility for game bonuses, or any other representation of value. Optionally, the primary value is usable for non-gaming goods and/or non-gaming services and the secondary value is usable for gaming services. For example, in one optional embodiment, the secondary value may be non-cashable gaming credits. In such an optional embodiment, the non-cashable gaming credits are usable as wagers for games of chance, but cannot be "cashed out," i.e. exchanged for currency. In an alternate optional embodiment, the gaming credits may be non-cashable under certain circumstances but may be converted upon predefined circumstances to cashable gaming credits.

Optionally, a user is associated 20 with a secondary value identifier. This may be an existing secondary value identifier or may be activated later, such as when the primary value identifier is purchased or the primary value is redeemed. The secondary value identifier could take many different forms, including a value-stored account, value-stored card, magnetic stripe card, smart card, storage device, transmitter, such as a Bluetooth® or other radio frequency identification ("RFID") transmitter, ticket, or voucher receivable into a gaming machine, or the like. It is noted that the primary value identifier and secondary value identifier could be separate, e.g. use different cards or account numbers, or the primary value identifier and secondary value identifier could be the same, e.g. use the same card or account number. The secondary value identifier is associated with a secondary value, although the secondary value could, in an optional embodiment, include zero.

For example, in one optional embodiment, the secondary value identifier is a rewards card that identifies a rewards account, such as a player tracking card for a player loyalty account at a casino, and the secondary value represents player rewards, such as points, discounts, match play, free play, bonuses, tournament play or buy in, additional value on "package deals," or the like. In such an optional embodiment, the secondary value identifier and secondary value may be an existing system and the association with the primary value identifier and primary value may be an enhancement to the existing system to promote the goods and services of the provider of the redemption services (as described in greater detail below).

The primary value, or a portion thereof, is redeemed 16 for goods and/or services. In an optional embodiment, the user may be allowed to redeem a portion of the primary value while retaining the remaining portion of the primary value. In such an optional embodiment, when at least a portion of the primary value is redeemed, the amount redeemed is decremented from the primary value. In an alternate optional embodiment, any remaining primary value may be lost if not used when the primary value is redeemed. In an optional embodiment, the database may be updated (although, again, the updating could occur in real time or periodically) to reflect the new primary value (if the user is permitted to retain an unused portion) or to indicate that the primary value has been redeemed (if the primary value is exhausted or unused portions are lost).

Redemption could occur when the user presents the primary value identifier. In one such optional embodiment, the primary value identifier is presented at a redemption terminal 26. The redemption terminal 26 generates a redemption signal. Optionally, the database server updates the database indicating redemption of the primary value upon receipt (whether directly or indirectly) of the redemption signal. Optionally, the redemption terminal may provide some indication to the user of the redemption of the primary value such as encoding a new balance or a zero balance on a magnetic stripe card, providing a receipt, providing a voucher, or otherwise recording redemption of the primary value. While the redemption terminal 26 could take many different forms, in an optional embodiment, the redemption terminal 26 may be a cash register, kiosk, general purpose computer, card reader, signal receiver, or the like, that can identify the primary value identifier and generate a redemption signal.

A secondary value is presented 18 upon redemption of the primary value. That is, when the primary value is redeemed, the user receives a secondary value. Depending upon the form of the secondary value, the user can then use the secondary value for goods and/or services. It is noted that the secondary value may be predetermined, calculable using some formula, random, or determined in any other fashion. The secondary value presented may be available in one form, or may be available in multiple different forms. In an optional embodiment in which different forms of secondary value are available, the form of the secondary value may be determined for the user, or selected by the user, or allocated between or among multiple different forms, or the like. For example, in an optional embodiment where the secondary value is usable for gaming services, a secondary value could be allocated between gaming credits and player reward points or any other forms of secondary value available.

In an optional embodiment, the secondary value may be stored in a secondary database which could be the same as the database storing primary value identifier information or could be a separate database. Additionally, separate databases may be provided at the activation terminal 22 side of the transaction, e.g. a merchant activating the primary value identifier, and the redemption side of the transaction, e.g. a provider of goods and/or services. In an optional embodiment where the secondary value is a reward issued through an existing rewards program, the database may be the existing rewards program database. In a further optional embodiment, at least a portion of the information in the secondary database could be exported and shared to broaden the locations where the secondary value may be redeemed and/or the goods or services for which the secondary value may be redeemed.

For example, a user could purchase and activate a plastic card, i.e. a primary value identifier, with a prepaid value, i.e. primary value, of $50.00. While not essential to the present invention, a user could purchase the plastic card at a retail shop, service station, or any other seller. The user can then use the prepaid value as a medium of exchange for goods and services. Optionally, the providers of goods and services that accept the primary value may be limited to certain locations and/or certain goods or services. In this example, redemption could be limited to a casino's non-gaming goods and services, e.g. restaurants, retail shops, or the like. Thus, the user of this example could redeem a portion of the $50.00 primary value for a $38.50 meal.

In this example, the user redeems the primary value by presenting the plastic card to a server, who uses a redemption terminal 26, which, as noted above, could be integrated into the cash register/payment processing system, to decrement the primary value as payment for the meal. Optionally, the redemption terminal 26 may communicate directly or indirectly with the database at the database server 24 using a computer network, such as a local area network ("LAN"), a wide area network ("WAN"), Internet connection, modem connection, or other communications network. As noted above and shown in FIG. 3, one or more intermediate transaction processors 28 could be disposed between the redemption terminal 26 and the database server 24 to process various elements of the transaction, thereby making the communication between the redemption terminal 26 and the database server 24 indirect rather than direct.

Referring generally to FIGS. 1-3, in one optional embodiment, once redemption is completed, i.e. the primary value has been decremented, the plastic card is returned to the user with a primary value of $11.50 remaining to be used for other transactions. In another optional embodiment, the primary value is merely identified as redeemed and any remaining balance is lost, i.e. even though less than $50.00 has been redeemed, any remaining primary value is unavailable for redemption.

Continuing with the example, with the redemption of a portion of the primary value represented by the prepaid $50.00 card, a secondary value is presented to the user. In an optional embodiment in which a secondary value identifier is used, the secondary value is added to a user's secondary value identifier. In this example, the secondary value is related to the user's player loyalty account and, as previously discussed, could include, but would not be limited to, discounts, points, free play, match play, tournament play, additional value on the player loyalty card or package offers, non-cashable gaming credits, or the like. It is also contemplated that the secondary value may be in the form of eligibility for additional rewards that may be earned while redeeming the secondary value. For example, the user may be eligible for bonuses that may be earned while redeeming secondary value for gambling that are randomly awarded or contingent upon the user obtaining a predetermined game outcome. Optionally, some aspect of the bonuses may be concealed from the player such that the amount of the bonus and/or the criterion or criteria used to award the bonus are a mystery to the user.

In this example, as discussed above, a user could associate an existing player tracking card tied to an existing player loyalty account with his or her primary value identifier. Alternatively, if the user does not have a player tracking card, then upon the user's redemption of at least a portion of the primary value at the hotel/casino property, the redemption may cause the enrollment of the user in the player tracking system. Optionally, the enrollment could be performed through an input device that collects the information automatically, such as through scanning, or manually. In this example, once a primary value identifier has been partially redeemed, the primary value identifier and secondary value identifier are associated in the database. In this example, the primary value is redeemable for non-gaming goods and services and the secondary value is redeemable for gaming or gaming-related goods or services. Thus, the providing of a secondary value upon redemption of at least a portion of the primary value benefits both the user, who receives a secondary value that can be redeemed for additional goods or services, and the provider of goods and services, which promotes the further sale of goods and services to a user who has already acquired a primary value from the provider:

While certain embodiments of the present invention have been shown and described it is to be understood that the present invention is subject to many modifications and changes without departing from the spirit and scope of the invention presented herein.

I claim:

1. A method for providing a secondary value to a user conducted by a gaming operator providing gaming services and at least one of non-gaming goods and non-gaming services comprising:

providing a database server configured to store a database;
providing an activation terminal;
providing a redemption terminal associated with said gaming operator providing gaming services;
associating a primary value identifier with a predefined primary value in said database at said database server, said primary value having a fixed value determined independent of chance;

activating said primary value identifier at said activation terminal;

providing said primary value identifier and said primary value to said user, said primary value provided to said user without requiring said user to wager to obtain said primary value;

defining a secondary value representing a predetermined value;

associating a secondary value identifier with said secondary value, said secondary value identifier having a non-cash form; and providing at least a predetermined portion of said secondary value exchangeable for gaming services to said user immediately upon said user redeeming at least a portion of said primary value for at least one of non-gaming goods and non-gaming services at said redemption terminal, such that said redemption of said primary value for at least one of non-gaming goods and non-gaming services is a sufficient condition for providing said secondary value to said user whereby said user receives said secondary value in addition to said primary value.

2. The method of claim 1 wherein said primary value is a monetary value.

3. The method of claim 1 wherein said primary value identifier is a prepaid value-stored card.

4. The method of claim 1 wherein said primary value identifier is a value-stored account.

5. The method of claim 1 wherein said primary value identifier is identified by a unique identity.

6. The method of claim 1 conducted by a gaming operator providing gaming services and non-gaming services wherein said primary value is redeemed for non-gaming services and said secondary value is exchanged for gaming services.

7. The method of claim 1 conducted by a gaming operator providing gaming services and non-gaming goods wherein said primary value is redeemed for non-gaming goods and said secondary value is exchanged for gaming services.

8. A method for a gaming operator providing gaming services, non-gaming services, and non-gaming goods to provide a secondary value exchangeable for gaming services to a user comprising:

providing a database server configured to store a database;

providing an activation terminal;

providing a redemption terminal associated with said gaming operator providing gaming services;

providing a gaming device configured to conduct gaming services;

associating a primary value identifier with a predefined primary value for at least one of said non-gaming services and non-gaming goods in said database at said database server, said primary value having a fixed value determined independent of chance;

activating said primary value identifier at said activation terminal;

providing said primary value identifier and said primary value to said user, said primary value provided to said user without requiring said user to wager to obtain said primary value;

defining a secondary value representing a predetermined value;

associating a secondary value identifier with said secondary value, said secondary value identifier having a non-cash form;

providing said secondary value identifier to said user following said user redeeming at least a portion of said primary value for at least one of said non-gaming services and non-gaming goods at said redemption terminal and providing said secondary value to said user immediately upon said user redeeming at least a portion of said primary value for at least one of said non-gaming services and non-gaming goods at said redemption terminal, such that redeeming at least a portion of said primary value for at least one of said non-gaming services and non-gaming goods is a sufficient condition for providing said secondary value identifier to said user whereby said user receives said secondary value in addition to said primary value; and providing gaming services at said gaming device to said user in exchange for at least a portion of said secondary value associated with said secondary value identifier.

9. The method of claim 8 wherein said primary value is a monetary value.

10. The method of claim 8 wherein said primary value identifier is a prepaid value-stored card.

11. The method of claim 8 wherein said primary value identifier is a value-stored account.

12. The method of claim 8 wherein said primary value identifier is identified by a unique identity.

13. The method of claim 8 wherein said gaming services comprise one or more games of chance on which a wager may be placed, and wherein said secondary value represents non-cashable gaming credits that may be used for said wager.

14. A system for a gaming operator providing gaming services, non-gaming services, and non-gaming goods to provide a secondary value exchangeable for gaming services to a user comprising:

a database server configured to store a database of a plurality of primary value identifiers each associated with a predefined primary value for at least one of said non-gaming services and non-gaming goods, said primary value having a fixed value determined independent of chance;

an activation terminal configured to transmit an activation signal such that when said database server receives said activation signal, said primary value identifier is identified as activated, said primary value activated and provided to said user without requiring said user to wager to obtain said primary value;

a redemption terminal associated with said gaming operator providing gaming services, said redemption terminal configured to redeem at least a portion of said primary value for at least one of non-gaming services and non-gaming goods and provide a secondary value identifier to said user immediately upon said redemption, said secondary value identifier associated with a secondary value representing a predetermined value, said redemption terminal configured such that said redemption of said primary value is a sufficient condition for said redemption terminal to provide said secondary value identifier to said user whereby said user receives said secondary value in addition to said primary value, said secondary value having a non-cash form; and a gaming device configured to conduct a game of chance on which a wager may be placed, said gaming device receiving at least a portion of said secondary value for at least a portion of said wager.

* * * * *